Feb. 26, 1957 A. G. BODINE, JR 2,783,008
ACOUSTICAL BOUNDARY LAYER CONTROL FOR AERODYNAMIC BODIES
Filed July 28, 1951 2 Sheets-Sheet 1
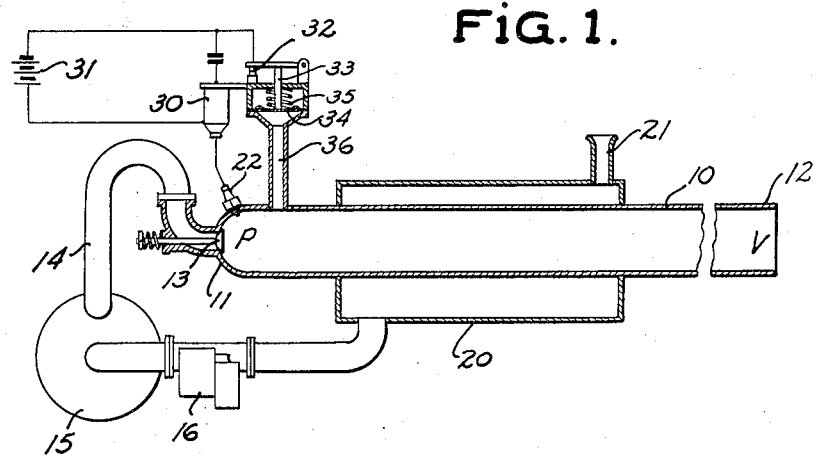
FIG. 1.
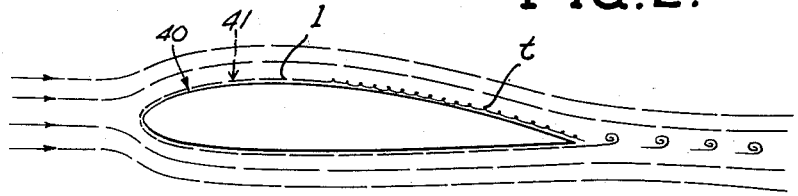
FIG. 2.
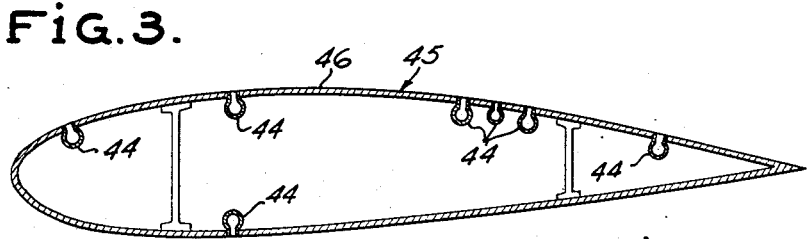
FIG. 3.
FIG. 4.     FIG. 5.     FIG. 6.
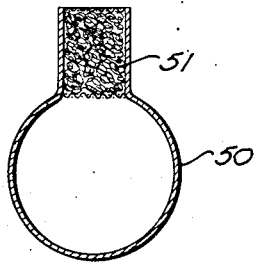 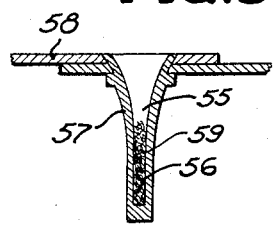 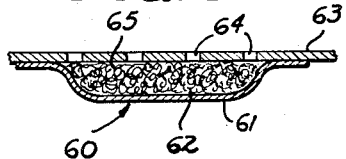
ALBERT G. BODINE JR.
INVENTOR.
BY
ATTORNEY.

Feb. 26, 1957   A. G. BODINE, JR   2,783,008
ACOUSTICAL BOUNDARY LAYER CONTROL FOR AERODYNAMIC BODIES
Filed July 28, 1951   2 Sheets-Sheet 2

ALBERT G. BODINE JR
INVENTOR.

BY *[signature]*

ATTORNEY.

United States Patent Office 2,783,008
Patented Feb. 26, 1957

2,783,008

ACOUSTICAL BOUNDARY LAYER CONTROL FOR AERODYNAMIC BODIES

Albert G. Bodine, Jr., Van Nuys, Calif.

Application July 28, 1951, Serial No. 239,168

4 Claims. (Cl. 244—130)

This invention relates generally to the control of deleterious fluid boundary layer conditions adjacent solid bodies in airflow apparatus, such as aircraft, missiles, and the like. The invention is not in all aspects restricted to such application, however, as it may also have application to interior airflow ducts in various classes of jet engines, turbines, and the like. Accordingly, reference hereinafter to an aerodynamic body travelling at high velocities contemplates the functionally equivalent situation of an aerodynamic body or shape in a high velocity duct, as in a jet engine.

The flow of gases over bodies at relatively high velocities, such as over the airfoil surfaces of aircraft, often brings about undesirable acoustic phenomena causing increased air drag, vibration and noise, and these effects are susceptible to acoustic control. It should of course be self-evident that aerodynamic sound or noise is the manifestation of acoustical vibrations. Many aerodynamic investigators have noted vibrational effects, particularly in connection with the shedding of vortices (Kármán vortex trail). Also, high frequency velocity fluctuations have been detected in the boundary layer region where so-called laminar flow has broken into turbulent flow above the critical value for Reynolds' number. Still further, it can be shown that even air which is in supposedly steady flow, is actually undergoing vibration. Apparently, however, the acoustic nature of these vibrational effects, and the fact that aerodynamic sound directly evidences acoustical vibration which may affect the aircraft structure, has received little, if any, attention.

A general object of the invention is accordingly the control of these acoustic phenomena, to the ends of reduction of air drag, vibration (both in the air and in the structure) and noise.

Only briefly introduced at this point, the present invention controls these acoustic conditions by interfering with them acoustically, employing acoustic dissipative, i. e., attenuative, means and methods. For example, sound waves maintained in the boundary layer region of a body adjacent an air stream desirably reduce the accumulation of drag-gas impeding relative motion between the gas and the body. Again, investigation has shown that boundary layer conditions adjacent airfoils involve acoustic phenomena, including components of frequencies determined by the aerodynamic characteristics of the airfoil, manifesting themselves generally as shock wave phenomena, and these conditions, which cause both vibration and accompanying noise, can be dissipated by employing acoustic means capable of interfering with such phenomena. In this connection, standing waves, shock waves and shock front, are equivalent terms denoting the same aerodynamic-acoustic phenomena, and the invention provides for attenuative control i. e., dissipation of such undesired acoustic performance either by radiating additional controlled sound waves into or along the boundary layer, breaking it up by interfering with its equilibrium state, or by employment of other kinds of acoustic attenuators, such as, for example, the absorber type. The shock wave, such as that existing at the leading edge of a supersonic airfoil, and which also includes components of frequencies determined by the aerodynamic characteristics of the airfoil, is also subject to control or attenuation by the present invention. A sound wave injected into the piled up layer of compressed air at the nose or leading edge of the supersonic airfoil tends to interfere with its equilibrium state and thereby disperse it, with the effect of reducing the thickness and/or lateral extension of the "shock front," and hence of reducing the energy dissipation owing to turbulence caused by the shock wave. The end result of the supersonic flight application of this invention is, first, reduction in the power necessary to drive an aircraft through the so-called sonic barrier, and second, reduction in vibrational effects to which the aircraft will be subjected at sonic speed.

The invention will be better understood by referring now to the following detailed description, reference being had to the accompanying drawings, in which:

Figure 1 shows an airflow apparatus in accordance with the invention;

Figure 2 is a diagrammatic view of an airfoil indicating certain of the conditions which it is the purpose of the present invention to alleviate;

Figure 3 is a cross-sectional view of an airfoil equipped with acoustic attenuation means in accordance with the invention;

Figure 4 shows an alternative type of acoustic attenuator;

Figure 5 is a sectional view showing an acoustical attenuator embodied in a structural rivet;

Figure 6 is a detail cross-section of an alternative form of acoustic attenuator;

Figure 7:
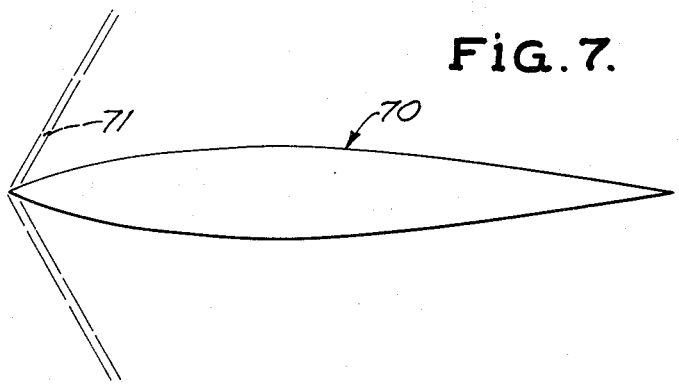
Figure 7 is a cross-sectional view of a supersonic airfoil showing the usual shock front.

In Figure 1, numeral 10 designates a metallic sonic pipe having a closed head end 11 and an open end 12 through which products of combustion are discharged to atmosphere. A combustible mixture is introduced into the zone P of pipe 10 through an intake valve 13, which may be of the spring-loaded type, so that it opens whenever the pressure in a fuel induction passage 14 exceeds the pressure in zone P by a predetermined amount. A supercharger 15, driven by means not shown, supplies the air-fuel mixture to the fuel induction passage 14. A carburetor 16 forms and delivers the fuel-air mixture to the intake of the supercharger. The air entering carburetor 16 passes first through a preheater in the form of a heat exchanger 20, comprising a jacket around pipe 10 and to which air is supplied through a mouth 21, thus obtaining a heat exchange between the incoming air and the heated column of combustion gases contained inside pipe 10 during the operation of the engine.

The charge of fuel introduced to the combustion zone at P by way of passage 14 and valve 13 is ignited as by means of spark plug 22, and the resulting explosion produces a sharp pressure rise at zone P, causing a wave of compression to be launched down the column of gas contained in pipe 10, this compression wave travelling with the speed of sound in the heated combustion gases. This compression wave will be reflected from the open end 12 of the pipe 10 as a wave of rarefaction, which upon reaching the zone P will produce a pressure depression, causing valve 13 to open, and an additional charge of fuel mixture to be introduced to zone P. The described wave of rarefaction is reflected by the closed end of pipe 10 as a wave of rarefaction traveling back towards the open end of the pipe, and this latter wave is in turn reflected by the open end of the pipe as a wave of compression returning toward the head end of the pipe. If the arrival of this wave of compression coincides with the next ignition of fuel-air mixture and resulting pressure increases at zone P, a re-enforced pressure peak occurs at P, with increased fuel density and increased compression ratio, thereby very materially improving the combustion cycle. Also, to follow on with the succeeding cycle, a re-enforced or augmented wave of compression is started down the pipe 10 from combustion zone P, and the cycle as previously described is then repeated, but with the pressure cycle traveling through greater amplitude swing as compared with the initial cycle. Under these conditions, a condition of quarter-wave resonance is established, with a pressure anti-node (zone of maximum pressure variation) at P, and a velocity anti-node V (zone of maximum velocity variation) at the far, open end 12 of the pipe, which functions as a guide for a standing wave in the combustion gases. While it is found in practice that the returning wave of compression so increases the pressure and density of the fuel-air mixture at the zone P as to cause ignition even without the continued use of spark plug 22, apparently by reason of an attenuated "after-flame" remaining in the zone P throughout the reduced pressure part of the cycle, the embodiment of Figure 1 includes an automatic timing system for energization of the spark plug 22. As shown, the spark plug is connected to the high voltage terminal of a conventional induction coil 30, the low voltage circuit of which includes battery 31 and a make-break switch 32, the latter being actuated by a plunger 33 connected to a diaphragm 34 urged in a direction to close the make and break switch by a spring 35. One side of the diaphragm is connected through passage 36 with the gas column in pipe 10 at zone P. Upon the appearance of each positive pressure peak or pulse at P, diaphragm 34 moves upwardly to break the low voltage circuit, causing the high tension coil to produce a spark at plug 22. This spark will thus be synchronized with the appearance of positive pressure pulses at zone P. It will be understood that the described waves of compression and rarefaction, which produce the pressure anti-node P and velocity anti-node V as described heretofore, are in the nature of sound waves. The system as operated produces quarter-wave resonance, a quarter-wave length standing sound wave being established in the gas column in the pipe. This standing sound wave scrubs the particles of the hot combustion gases against the inner surfaces of pipe 10, inhibiting the tendency toward accumulation of a boundary layer of stagnant gases adjacent the inside surfaces of the pipe. The prevention or inhibiting of this boundary layer improves heat transfer from the combustion gases to the pipe, and thence to the incoming air. Also, the removal of this drag gas removes a source of viscous resistance to gas flow through the pipe.

From the above example, it will be seen that sound waves maintained in the boundary layer region of a body adjacent an air stream desirably reduce or prevent the accumulation of stagnant gas in a layer immediately adjacent the body, improving heat transfer, and also reducing the drag effect of boundary layer gas on airflow parallel to the body. This is, then, an example of improved airflow owing to maintenance of sound waves in a boundary layer region.

Referring now to Figure 2, the numeral 40 designates a cambered airfoil shape (either a surface of revolution, or a wing section), with the usual airstream lines shown therearound. The boundary layer adjacent the skin of the airfoil is designated generally by the numeral 41, and is shown as laminar over the forward portion of the airfoil, as indicated at 1, and then breaking into turbulent flow as indicated at $t$. It has long been known that the flow in the turbulent region $t$ is characterized by high frequency velocity fluctuations, eddies, and the like, leading to vibrational effects and noise. However, as was not at first so evident, even the laminar flow portion of the boundary layer is actually unsteady and possessed of vibrational effects, as has now been demonstrated, and laminar flow boundary layer air is thus also a source of vibration and aerodynamic noise. These uncontrolled acoustic effects often disturb the desired airflow pattern, and can be responsible for considerable drag.

In addition, recent investigations have produced results indicating that acoustic standing waves or shock fronts are apparently set up in the airflow path along the airfoil, with discrete velocity and pressure anti-node regions. The air pressure vibrations particularly at the pressure anti-node regions are capable of reacting on the airfoil to produce structural vibration.

Finally, the vortices periodically shed by the trailing edge of the airfoil in starting, and with velocity deviations, react on the airfoil to produce further vibrational effects. It is believed that these undesired effects are augmented by the velocity fluctuations in certain regions around the wing when acoustic standing waves are permitted to develop, as mentioned in the preceding paragraph.

These undesirable conditions I am able to control by means of the acoustic attenuators 44 shown in connection with the airfoil 45 of Figure 3. In this instance, the attenuators are in the nature of Helmholtz resonators or resonant absorbers, mounted inside the airfoil, with their necks mounted in the airfoil skin 46, and their mouths opening to the outside in a plane flush with the outer surface of skin 46. Other types of attenuators may be employed, such as resonant quarter wave pipes, exponential horns having attenuative terminations, and the like. Also, the Helmholtz type may be further aided by packing its neck region with a porous or absorptive body, such as a porous ceramic, a body of packed fibrous material, such as fiber glass, and the like.

The attenuators are designed in accordance with known acoustic principles to be resonant to sound waves detected in the boundary layer, or radiated therefrom, or to vibrations in the airfoil structure which are believed to be of acoustic origin and to be driven by fluctuating air in the boundary layer. Known acoustical techniques, making use of sensitive microphones, probes, and the like, permit these vibrations to be picked up and their frequencies ascertained, particularly frequencies for resonant peaks. Also, by such probing, the location of pressure anti-nodes of acoustic standing waves may be established.

Having determined the frequency of acoustic vibrations in the boundary layer region of the airfoil, as described in the preceding paragraph, the acoustic attenuators 44 may be properly designed, in accordance with known acoustic principles, to be resonant thereto. Accordingly, resonant acoustic attenuators 44 are installed in the airfoil, as earlier described, and as typically indicated in Figure 3, and it will be understood that these attenuators are selected in size and dimensions to be resonant, and therefore responsive, to acoustic vibrations which are to be attenuated. The particular attenuators here shown are of the Helmholtz resonator type, and they are effective to attenuate sound waves to which they are resonant by virtue of turbulence and viscosity losses in the air mass oscillating in their reduced neck portions. A detailed description of the operation of a Helmholtz resonator will not be required herein, it being sufficient to note that such a resonator is a known acoustic device capable of materially attenuating a sound wave of a particular frequency to which it is resonant.

The attenuators 44 are installed along the surface of the airfoil at selected locations where the sound wave action may best be attenuated or inhibited. If a pressure anti-node of acoustic standing wave or shock front has been located along the airfoil surface, a resonant absorber 44, tuned to the frequency of the wave, may advantageously be located in the region of such pressure anti-node. So located, it will have maximum effectiveness in dissipating or attenuating the standing wave. Even in the absence of a standing wave condition, the resonant absorber acts to attenuate sound waves incident therein, provided its resonant frequency corresponds approximately to the frequency of the sound wave.

In the event that standing waves are known or believed to exist along the airfoil, and that the wave frequency is known, the length ($\lambda$) of the wave may be determined by the well known expression $$\lambda = \frac{V}{f}$$

where V is velocity of sound in air and $f$ is the wave frequency. A typical wave length would be in the range of 2', and a quarter wave length would then be about 6". This means that pressure and velocity anti-nodes of the standing wave will be spaced apart by 6" intervals. I may then locate two of the resonant absorbers 44 a quarter wave length (e. g. 6") apart, without knowing the locations of the pressure and velocity anti-nodes. If one of the resonant absorbers should then not happen to coincide with a pressure anti-node, it will nevertheless be effective to some extent (unless it should happen to coincide with a velocity anti-node) and since the other of the quarter wave spaced resonant absorbers will then not coincide with a velocity anti-node (where the attenuative effect would be nil), it will also aid in attenuation of the wave. The net effect is as though one attenuator had been located precisely at the point for optimum attenuation, namely, in coincidence with a pressure anti-node.

As intimated earlier, other types of attenuators may be employed, but one particularly effective type comprises a Helmholtz resonator, provided with a porous body in its neck, e. g., a confined mass of packed fiber glass. Thus in Figure 4 I have shown a Helmholtz resonator cavity 50, having in its neck a porous body 51, in this instance comprising a packed body of fiber glass or the like. Such a porous body in the neck of the resonator has two beneficial effects, first, in that the sound wave frequency band to which the device is responsive is thereby broadened, and second, in that the attenuative action is much increased.

By careful installation of such sound wave attenuators, taking into account sound wave frequencies found in the boundary layer, the aerodynamic structure, etc., acoustic phenomenon may be very greatly inhibited, if not eliminated entirely. The result is suppression of seriously undesirable vibration, noise, and certain undesirable turbulence effects of acoustic origin.

The true theory underlying aerodynamic sound, and the vibrational manifestations which accompany it, or produce it, is not entirely clear; I can, however, secure a substantial degree of control over the phenomena by controlling the sound waves in the boundary layer.

Figure 5 shows a modified attenuator, comprising an elongated exponential horn 55 with an attenuative termination 56, incorporated in a structural rivet 57 to be used in the skin 58 of the airfoil. The attenuative termination 56 may comprise a relatively long slender passage, or a shorter passage packed with an attenuative substance such as fiber glass wool, as indicated at 59.

Figure 6 shows another "flutter" attenuator 60, embodying a wall 61 forming a pocket 62 on the underside of airfoil skin 63, there being holes 64 in skin 63 establishing communication between the pocket and the boundary layer, and a body 65 of absorptive material, such as fiber glass wool, inside pocket 62. Such an attenuator is effective at the location of a pressure anti-node region of a standing sound wave in the boundary layer to damp the vibration of the skin, and also to attenuate the sound wave.

Figure 7 shows a supersonic airfoil 70, and the familiar "shock front" 71 formed at its leading edge or nose at sonic and supersonic speed. This shock front or shock wave is subject to control or attenuation by sound wave radiation into the boundary layer at the nose of the airfoil. The nose or leading edge of a supersonic airfoil, traveling at sonic or supersonic speed, acquires a thick layer of compressed air, and the shock wave is the result of this layer being split by the leading edge of the airfoil. In full sonic flight, this boundary layer condition at the leading edge becomes quite thick and dense. Sound waves injected into the boundary layer under these circumstances disperse it by interfering with its equilibrium condition, reducing the thickness and lateral extension of the shock wave, and materially reducing flight resistance at sonic speed.

Figure 8:
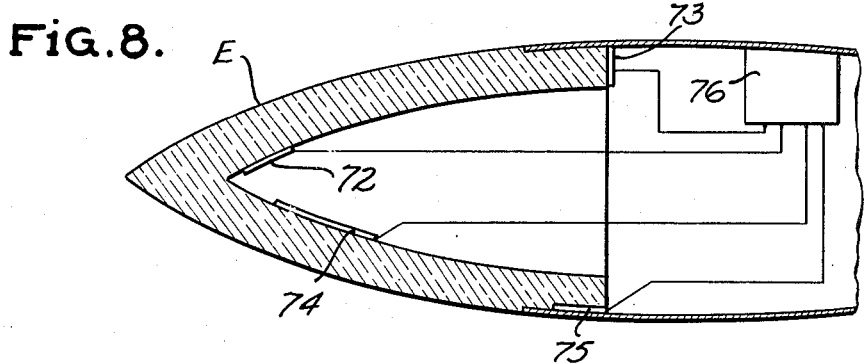
Figure 8 is a cross-sectional view of the nose portion of a supersonic airfoil equipped with means in accordance with the invention for dissipating the shock front condition illustrated in Figure 7.

As shown in Figure 8, the leading edge and a substantial portion of the lateral surface of the airfoil is made to be a sound wave radiator. This portion of the airfoil itself is formed by a properly shaped member E composed of an electrostrictive material, such as barium titanate, which is a dielectric ceramic (like a piezo-electric crystal) which is subject to cyclic electrostriction when subjected to a cyclic electrostatic field. As here shown, two separate pairs of electrodes 72, 73 and 74, 75 are energized through suitable electric circuits from an oscillator 76. The material in between the electrodes of each pair is subject to electrostriction in response to the frequency and power of the output from oscillator 76, setting the member E into corresponding vibration. The member E thus becomes a radiator of sound, of frequency governed by the frequency of the oscillator 76, and projects its radiated sound wave into the leading edge boundary region of the airfoil where the compressed air condition tends to develop at sonic speed. As already set forth, this radiation of sound into the piled up boundary layer condition disperses the compressed air layer and reduces the magnitude of the shock front.

Figure 9:
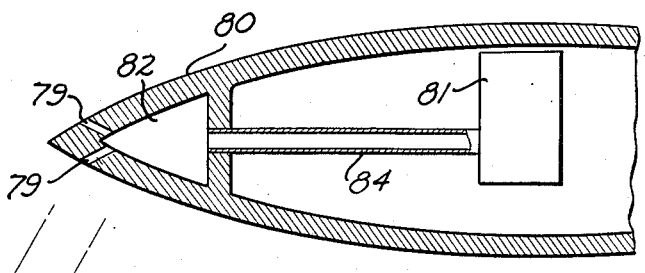
Figure 9 shows a modification of Figure 8.

Sound waves may also be radiated through ports 79 in the nose 80 of a supersonic airfoil, to which are connected a siren type of sound wave generator 81, as indicated in Figure 9. As here shown the nose member 80 has a transverse air passage 82, understood to extend substantially the full transverse dimension of the airfoil (at right angles to the plane of the drawing), and the sound wave generator is connected into this passage 82 by pipe 84. Sound from the generator is thus piped to passage 82, and emitted via ports 79, with the same results described in the preceding paragraph.

Figure 10:
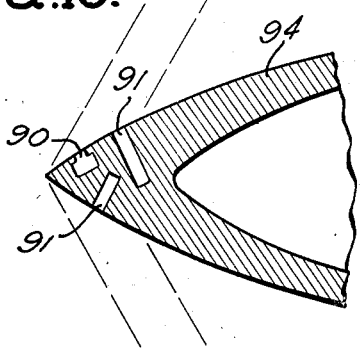
Figure 10 shows the nose of a supersonic airfoil provided with another form of the invention.

The shock wave for supersonic flight may also be attenuated by use of resonant absorbers in the nose of the airfoil. Thus, in Figure 10, I have indicated a Helmholtz resonator 90, and two quarter-wave length holes 91 (quarter wave length for two different frequencies), formed in the nose member 94 closely adjacent the leading edge. The shock wave contains high frequency sound wave components, and can be suppressed to an extent by absorbing these components by use of resonant absorbers such as shown, designed to be resonant for the offensive frequencies.

Summarizing briefly, many air flow irregularities are accompanied by acoustic phenomena or actually consist in acoustic phenomena. These phenomena, and the manifestations of noise and vibration produced thereby, are subject to control and attenuation by the described provisions of the present invention. It will be understood, of course, that the specific disclosed provisions of the invention for interference with the acoustic phenomena characteristic of the boundary layer and of the shock front are merely illustrative of various means which may be provided in accordance with the broad principles of the invention, and that various modifications and alternative expedients may be employed without departing from the spirit and scope of the appended claims.

I claim:

1. Means for controlling the shock front originating from the splitting of a layer of compressed air tending to accumulate on an aerodynamic body in the region of its leading edge at velocities of sonic order, that comprises, in combination with a supersonic aerodynamic body, a resonant sound wave absorber, tuned to respond to and to have an attenuative effect on a high frequency sound wave component of said shock front, mounted in said aerodynamic body and communicating with said layer in the region of the leading edge of said body.

2. Means for controlling the shock front originating in a layer of air adjacent an external surface of an aerodynamic body operating under conditions wherein the relative velocity between said surface and the air outwardly of said layer is of sonic order and wherein said shock front includes acoustic components of frequencies determined by the aerodynamic characteristics of said body, comprising: in combination with said aerodynamic body, sound wave attenuator means mounted in said aerodynamic body and having a portion thereof extending to the said outer surface and communicating with said layer of air in the region of the shock front formation for attenuating said frequencies at said region.

3. Means as defined in claim 2 wherein said attenuator is a sound wave absorber.

4. Means as defined in claim 2 wherein said attenuator is a sound wave generator.

References Cited in the file of this patent

UNITED STATES PATENTS

| | | |
|---|---|---|
| 2,043,416 | Lueg | June 9, 1936 |
| 2,071,012 | Adams | Feb. 16, 1937 |
| 2,122,447 | Zand | July 5, 1938 |
| 2,271,892 | Bourne | Feb. 3, 1942 |
| 2,297,046 | Bourne | Sept. 29, 1942 |
| 2,361,071 | Vang | Oct. 24, 1944 |
| 2,356,640 | Wolff | Aug. 22, 1944 |
| 2,407,400 | Chamberlain | Sept. 10, 1946 |
| 2,417,347 | Brown | Mar. 11, 1947 |
| 2,426,334 | Banning | Aug. 26, 1947 |
| 2,448,966 | Fales | Sept. 7, 1948 |